(12) United States Patent
Wortmann et al.

(10) Patent No.: US 10,168,105 B2
(45) Date of Patent: Jan. 1, 2019

(54) DEVICE AND METHOD FOR STORING HEAT

(75) Inventors: Jürgen Wortmann, Limburgerhof (DE); Claus Schäfer, Hochdorf-Assenheim (DE); Michael Lutz, Speyer (DE); Fabian Seeler, Dossenheim (DE); Martin Gärtner, Worms (DE); Felix Major, Mannheim (DE); Kerstin Schierle-Arndt, Zwingenberg (DE); Otto Machhammer, Mannheim (DE); Günther Huber, Ludwigshafen (DE); Stephan Maurer, Neustadt-Gimmeldingen (DE)

(73) Assignee: BASF SE, Ludwigshafen am Rhein (DE)

( * ) Notice: Subject to any disclaimer, the term of this patent is extended or adjusted under 35 U.S.C. 154(b) by 750 days.

(21) Appl. No.: 13/100,587

(22) Filed: May 4, 2011

(65) Prior Publication Data

US 2011/0271953 A1 Nov. 10, 2011

Related U.S. Application Data

(60) Provisional application No. 61/330,953, filed on May 4, 2010.

(51) Int. Cl.
*F24J 2/34* (2006.01)
*F28D 20/00* (2006.01)

(52) U.S. Cl.
CPC ..... *F28D 20/0034* (2013.01); *F28D 20/0039* (2013.01); *F28D 2020/0047* (2013.01);
(Continued)

(58) Field of Classification Search
USPC ............... 126/619, 617, 671–620, 640–462
See application file for complete search history.

(56) References Cited

U.S. PATENT DOCUMENTS 3,780,262 A * 12/1973 Rudd ........................... 392/339
4,015,749 A * 4/1977 Arzberger ............. A47J 31/401
222/129.4
(Continued)

FOREIGN PATENT DOCUMENTS

DE 10040892 C1 10/2001
DE 10347884 B3 6/2005
(Continued)

OTHER PUBLICATIONS

Indian Office Action for Indian Application No. 9375/CHEN/2012, dated Apr. 11, 2018.

*Primary Examiner* — Vivek Shirsat
(74) *Attorney, Agent, or Firm* — Drinker Biddle & Reath LLP

(57) ABSTRACT

The invention relates to a device for storing heat, comprising a heat storage medium which absorbs heat in order to store heat and releases heat in order to use the stored heat, and a container for holding the heat storage medium, the container being closed by a gastight cover, and the device comprising volume compensation means in order to compensate for a volume increase of the heat storage medium (3) due to a temperature rise and a volume decrease due to a temperature reduction. The invention furthermore relates to a method for storing heat, in which heat is transferred to a heat storage medium in order to store heat or heat is discharged from the heat storage medium to the heat carrier in order to use the heat, the heat storage medium being held in a container which is closed by a gastight cover, wherein a volume expansion of the heat storage medium (3) is compensated for by a volume increase of the container (1) or by heat storage medium (3) flowing out of the container (1) into a buffer container (21; 63, 65), and a volume decrease of the heat storage medium (3) is compensated for by a volume
(Continued)

Figure 4:
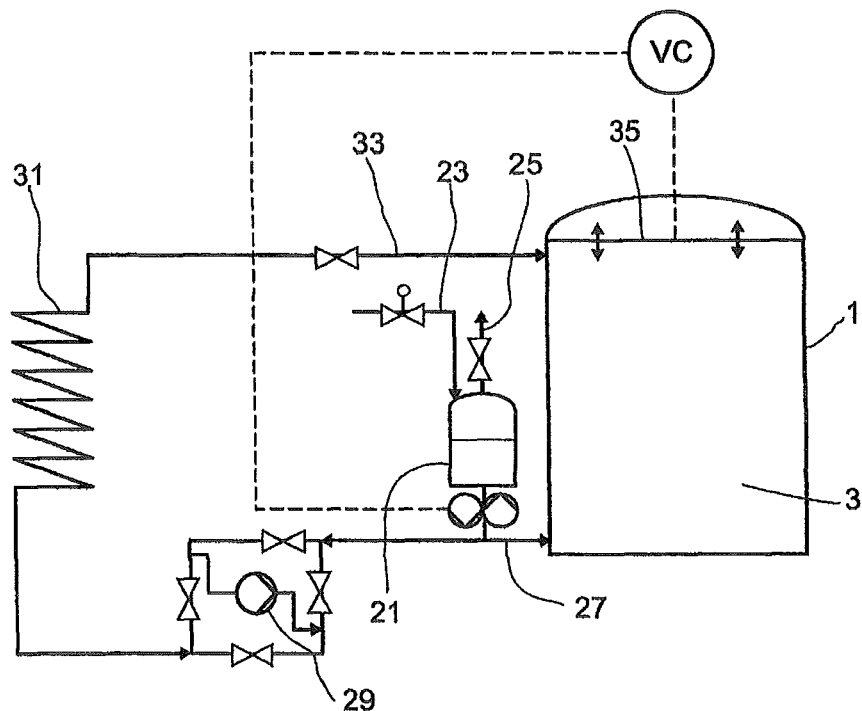

decrease of the container (1) or by heat storage medium (3) flowing out of the buffer container (21; 63, 65) into the container (1).

3 Claims, 5 Drawing Sheets

(52) U.S. Cl.
CPC .............. *F28D 2020/0069* (2013.01); *F28D 2020/0091* (2013.01); *Y02E 60/142* (2013.01)

(56) References Cited

U.S. PATENT DOCUMENTS

| | | | | |
|---|---|---|---|---|
| 4,108,374 A * | 8/1978 | Lyon et al. | ............ | 126/590 |
| 4,233,960 A * | 11/1980 | Johnson | ............ | 126/572 |
| 4,253,446 A * | 3/1981 | Muller | ............ | 126/610 |
| 4,257,399 A * | 3/1981 | Shonerd | ............ | 126/583 |
| 4,324,228 A * | 4/1982 | Shippee | ............ | F24D 3/1008 |
| | | | | 126/640 |
| 4,341,262 A * | 7/1982 | Alspaugh | ............ | F28D 20/003 |
| | | | | 126/617 |
| 4,345,715 A * | 8/1982 | Van Craenenbroeck | ....... | 237/66 |
| 4,360,005 A * | 11/1982 | Sharpe | ............ | 126/599 |
| 4,403,643 A * | 9/1983 | Minto | ............ | 165/104.12 |
| 4,503,839 A * | 3/1985 | Dunstan | ............ | 126/563 |
| 4,537,180 A | 8/1985 | Minor | | |
| 4,556,100 A * | 12/1985 | Whitman | ............ | 165/10 |
| 4,624,242 A | 11/1986 | McCall | | |
| 4,645,125 A * | 2/1987 | Omori | ............ | 237/12 |
| 4,681,154 A * | 7/1987 | Yano et al. | ............ | 165/47 |
| 4,691,692 A * | 9/1987 | Conner et al. | ............ | 126/584 |
| 4,880,135 A * | 11/1989 | Neou | ............ | 220/721 |
| 5,340,383 A * | 8/1994 | Womack | ............ | 95/243 |
| 6,079,481 A * | 6/2000 | Lowenstein et al. | ............ | 165/10 |
| 6,763,826 B1 * | 7/2004 | Gumm et al. | ............ | 126/599 |
| 7,614,397 B1 * | 11/2009 | Munson, Jr. | ............ | 126/617 |
| 2004/0011395 A1 * | 1/2004 | Nicoletti et al. | ............ | 136/246 |
| 2004/0154694 A1 * | 8/2004 | Trzmiel et al. | ............ | 141/113 |
| 2008/0245092 A1 * | 10/2008 | Forsberg et al. | ............ | 62/288 |
| 2010/0314398 A1 * | 12/2010 | Gocze | ............ | 220/592.2 |
| 2011/0271953 A1 * | 11/2011 | Wortmann et al. | ............ | 126/619 |
| 2012/0074150 A1 * | 3/2012 | Wortmann et al. | ............ | 220/592.2 |

FOREIGN PATENT DOCUMENTS

| | | | | |
|---|---|---|---|---|
| DE | 202009015401 U1 | 3/2010 | | |
| EP | 1767882 A2 | 3/2007 | | |
| GB | 2274329 A | 7/1994 | | |
| JP | S55-089692 A | 7/1980 | | |
| JP | S56-081385 A | 7/1981 | | |
| JP | 57065584 A * | 4/1982 | ............ | F28D 17/00 |
| JP | S57-126882 A | 8/1982 | | |
| JP | H02-139889 A | 5/1990 | | |
| JP | H11-044495 A | 2/1999 | | |
| JP | 2000-304480 A | 11/2000 | | |
| JP | 2001-006431 A | 1/2001 | | |
| JP | 2002-263440 A | 9/2002 | | |
| JP | 2002-338969 A | 11/2002 | | |
| JP | 2004-156804 A | 6/2004 | | |
| JP | 2004-278857 A | 10/2004 | | |
| JP | 2008-014627 A | 1/2008 | | |
| JP | 2008-082692 A | 4/2008 | | |
| JP | 2010-058058 A | 3/2010 | | |
| WO | WO-03/081145 A1 | 10/2003 | | |

\* cited by examiner

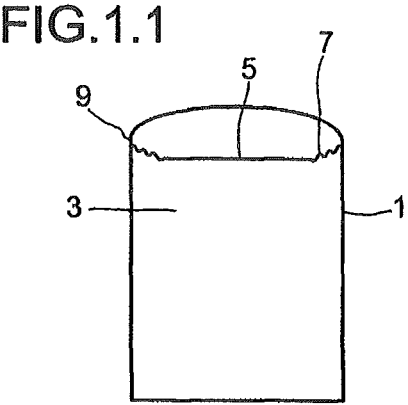
FIG.1.1
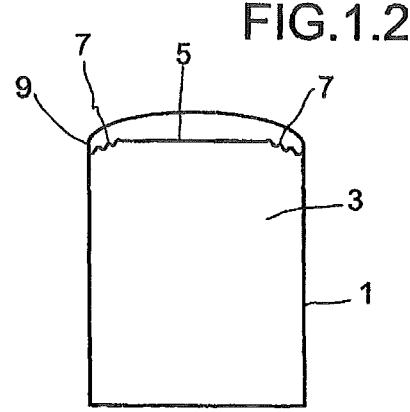
FIG.1.2
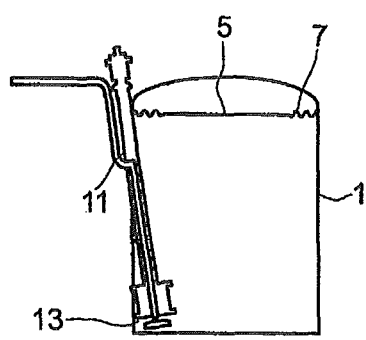
FIG.2
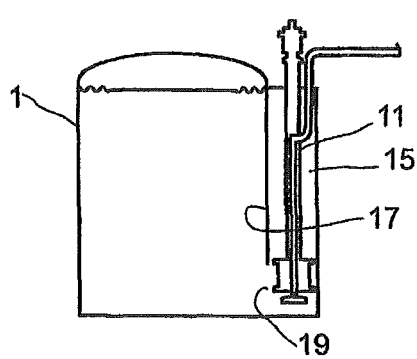
FIG.3

DEVICE AND METHOD FOR STORING HEAT

CROSS-REFERENCE TO RELATED APPLICATIONS

This application claims benefit (under 35 USC 119(e)) of U.S. Provisional application 61/330,953, filed May 4, 2010 which is incorporated by reference.

BACKGROUND OF THE INVENTION

The invention is based on a device for storing heat, comprising a heat storage medium which absorbs heat in order to store heat and releases heat in order to use the stored heat, and a container for holding the heat storage medium, the container being closed by a gastight cover. The invention is furthermore based on a method for storing heat, in which, in a heat exchanger, heat is transferred from a heat carrier to a heat storage medium or, in the heat exchanger, heat is discharged from the heat storage medium to the heat carrier, the heat storage medium being held in a container which is closed by a gastight cover.

Devices and methods for storing heat are used, for example, in solar power stations. By using the device or method for storing heat, solar power stations can be operated uninterrupted even in periods without sun, for example at night. In order to allow uninterrupted operation, large solar power stations require very large heat storage tanks. For example, it is known that in the currently widely operated parabolic trough solar power stations with an electrical power of 50 MW, salt storage tanks are used which contain up to 28,000 t of salt as a heat storage medium. The salt is stored in two dually arranged tanks. Under the effect of sunlight, the heat carrier medium heated in the solar field is driven from the cold tank to the hot tank. When unloading, the heat storage medium is taken from the hot tank and cooled in the power station while generating electrical energy. The cooled heat storage medium is returned to the cold tank.

In order to be able to operate solar power stations with a higher power or over a longer period of time without interruption, much larger heat storage tanks are required compared with the currently known devices for storing heat. In this case, on the one hand, it is possible to use a large number of smaller storage tanks, although this entails a large area requirement, or to use large storage tanks.

In order to prevent a negative pressure from being formed in the container, owing to which unreliably large forces act on the shell of the container, unoccupied volume in the containers is filled with a gas. In the case of oxidizable heat storage media, it is also necessary to avoid oxidation. To this end, for example, nitrogen is used as a gas for occupying the volume not filled with the heat storage medium. In the case of heat storage media which cannot be oxidized, air may also be used for this.

In the event of temperature variations in the storage system, the volume s occupied by the heat storage medium change owing to thermal expansions of the heat storage medium. The volume of the gaseous tank content changes to a particularly pronounced extent in this case. The prevalence of high pressures owing to the design of the container necessitates great outlay. For this reason, additional pressure loads on the shell of the container should be prevented. To this end, large containers are preferably operated at ambient pressure. Currently, the volume change due to the thermal expansion of the heat storage medium is ensured by discharging gas to the surroundings when there is a volume increase. Gas then needs to be resupplied when there is a reduction in the temperature of the heat storage medium. This requires the procurement and provision of gas in order to be able to compensate for corresponding variations. When using a heat storage medium with a high vapor pressure, it is necessary to provide for particularly large gas exchange quantities caused by evaporation in the hot storage phase and by condensation in the cold storage phase.

In the case of oxidation-sensitive heat storage mediums, for example oil, the gas undertakes an inerting function. Even in small concentrations, oxygen can lead to oxidation processes of the heat storage medium, in which case detrimental, for example insoluble products may be formed. Undesired deposits can occur as a result of this. The storage capacity of the heat storage medium is furthermore affected by the formation of insoluble products. Currently, separation of high-boiling components by distillation may be carried out in order to remove such undesired deposits. As an alternative, a heat storage medium in which deposits have formed is replaced. In the case of a combustible heat storage medium, a sufficiently large concentration of oxygen together with a significant vapor pressure can also lead to an explosion risk. In the case of substances not sensitive to oxidation as the heat storage medium, for example when using nitrate melts, the device may for example also be operated with air as a gas to compensate for volume variations.

In particular when a gas overhead with an inert gas is necessary, high operating costs are involved. Liquid nitrogen is currently used for volume compensation in solar power stations, which is evaporated and delivered to the heat storage medium. By using large isobaric gas storage tanks with a variable volume, which are also referred to as gasometers, it is possible to construct a gas buffer system. Owing to the variable volume, the excess gas can be collected during the heating and released during cooling. The use of such gasometers, however, is problematic when using heat storage mediums having a significant vapor pressure, since the heat storage medium condenses into the gasometer. In order to prevent condensation, it is necessary to have coolers which effectively condense out heat storage medium which has evaporated in the gas, and recycle it. These devices, however, are very elaborate to construct and operate.

Furthermore, floating lid tanks are also known. Floating lids, however, generally are not made fully gastight and, for example, have wall seals with the container wall. An improvement of the gastightness is achieved, for example, by the use of a second sealing system. For use with the high temperatures of a heat storage tank, however, this solution is not sufficient. Oxygen can reach the material which is oxidation-sensitive at high storage temperatures and undesired solids, or also undesired inert gases such as carbon monoxide or carbon dioxide in the case of heat storage mediums containing carbon, can be formed by oxidation. When using heat storage mediums containing sulfur, sulfur dioxide and sulfur trioxide can be formed, which can damage the container walls by corrosion.

SUMMARY OF THE INVENTION

It is an object of the present invention to provide a device for storing heat, which does not have the disadvantages known from the prior art and can be operated reliably even at high temperatures.

The object is achieved by a device for storing heat, comprising a heat storage medium which absorbs heat in order to store heat and releases heat in order to use the stored heat, and a container for holding the heat storage medium, the container being closed by a gastight cover, and which device comprises volume compensation means in order to compensate for a volume increase of the heat storage medium due to a temperature rise and a volume decrease of the heat storage medium due to a temperature reduction.

The object is furthermore achieved by a method for storing heat, in which heat is transferred to a heat storage medium in order to store heat or heat is discharged from the heat storage medium to the heat carrier in order to use the heat, the heat storage medium being held in a container which is closed by a gastight cover, wherein a volume expansion of the heat storage medium is compensated for by a volume increase of the container or by heat storage medium flowing out of the container into a buffer container, and a volume decrease of the heat storage medium is compensated for by a volume decrease of the container or by heat storage medium flowing out of the buffer container into the container.

A BRIEF DESCRIPTION OF THE FIGURES

Figure 5:
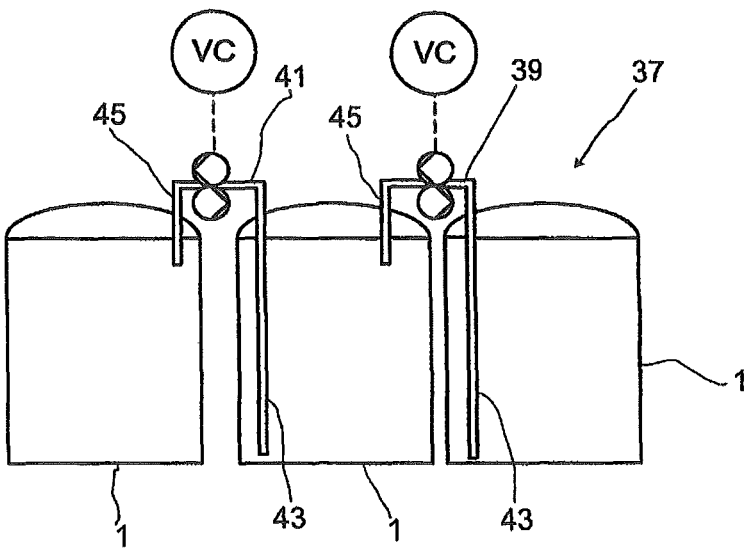
Figure 6:
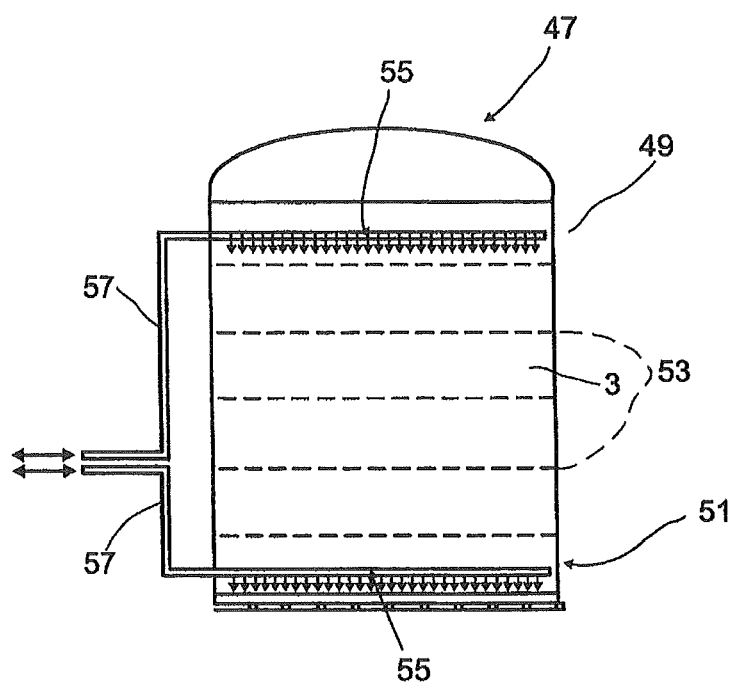
Figure 7:
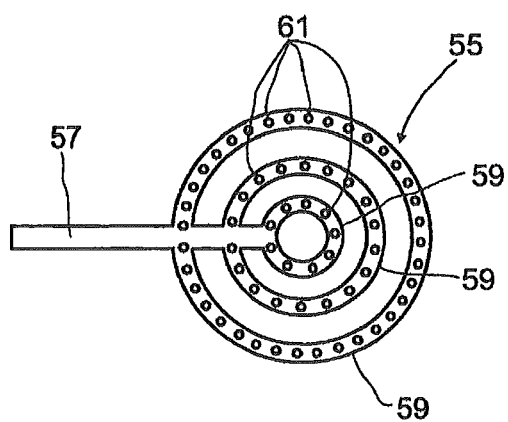
Figure 8:
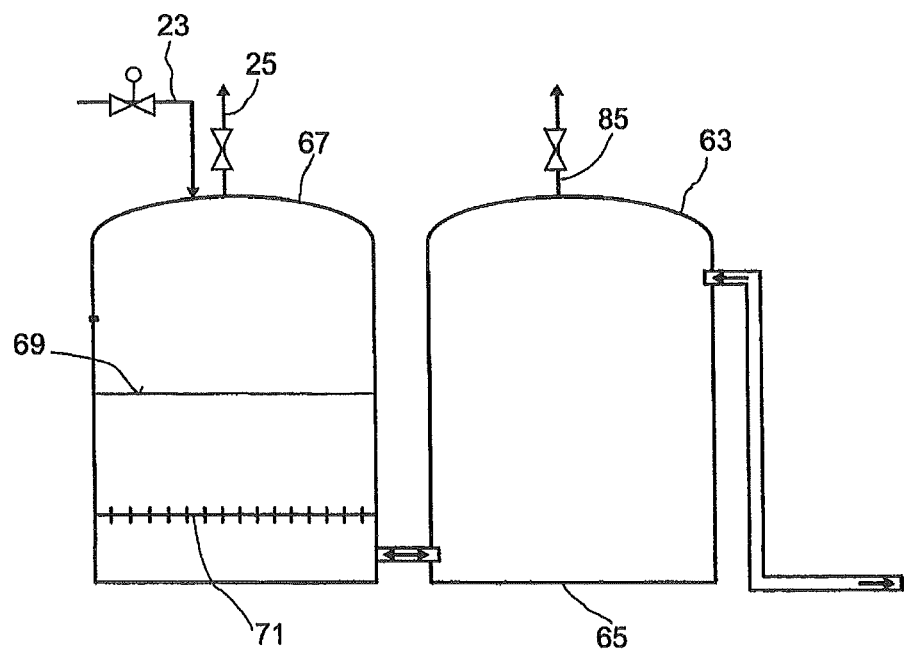
Figure 9:
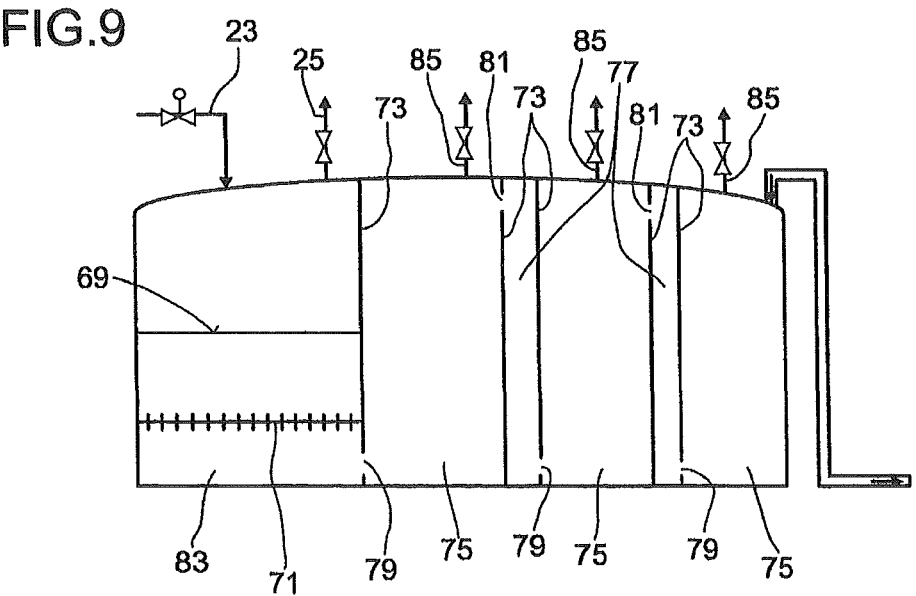
Figure 10:
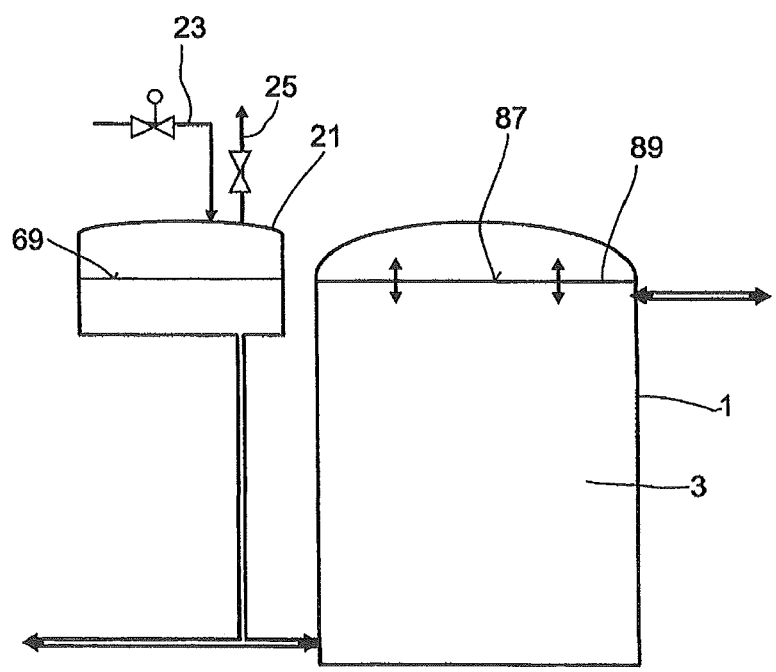

FIG. 1.1 shows a container for holding a heat storage medium, having a flexible cover and containing a cold heat storage medium, FIG. 1.2 shows a container for holding a heat storage medium, having a flexible cover and containing a hot heat storage medium, FIG. 2 shows a container for holding a heat storage medium, having a flexible cover and an immersion pump in a first embodiment, FIG. 3 shows a container for holding a heat storage medium, having a flexible cover and an immersion pump in a second embodiment, FIG. 4 shows a device for storing heat, having a buffer container, FIG. 5 shows containers for holding a heat storage medium, as serial stratified storage tanks, FIG. 6 shows a container for holding a heat storage medium, which is configured as a stratified storage tank, FIG. 7 shows a manifold, as is used in a stratified storage tank according to FIG. 6, in plan view, FIG. 8 shows two buffer containers connected in series, FIG. 9 shows a container for holding a heat storage medium, which is combined integrally with a buffer container, and FIG. 10 shows a container for holding a heat storage medium, having buffer containers in another embodiment.

A DETAILED DESCRIPTION OF THE INVENTION

The device according to the invention is suitable in particular when oxidation-sensitive and/or low-boiling substances are used as heat storage medium.

The gastight cover of the container prevents oxygen from the outside from being able to reach the heat storage medium. It also prevents gas, which is contained in the system, from being able to escape. Owing to the use of the volume compensation means, moreover, it is particularly advantageous that the container does not have to contain any gas with which volume variations can be compensated for. The volume variations of the heat storage medium are compensated for only by making the container larger or smaller, or alternatively by the heat storage medium flowing into a buffer container.

In a first embodiment, the volume compensation means comprise a flexible cover of the container. The flexible cover of the container may, for example, be produced by a suitable container lid which is raised when there is a volume expansion of the heat storage medium and is lowered again when there is a volume decrease of the heat storage medium, without the seal on the edge of the cover being broken. In particular, it is possible for the flexible cover to comprise flexible regions, which expand when there is a volume increase of the heat storage medium and which contract when there is a volume decrease of the heat storage medium. The flexible regions of the lid may extend over the entire cover or alternatively only occupy parts of the cover. If the flexible regions only comprise parts of the cover, then it is possible for example for parts of the cover to be configured in the form of a compensator which can expand when there is a volume increase. Such a compensator has, for example, the form of a bellows. As an alternative, it is also possible for raising and lowering of the cover of the container, according to the volume of the heat storage medium, to be achieved by using the region s configured as a compensator. Through the use of flexible regions in the cover of the container, it is possible to connect the cover firmly to the container, in particular gastightly to the container. Connection may, for example, be carried out by welding.

In order to prevent a large volume increase from occurring owing to gas above the heat storage medium, a gas separator is provided in an advantageous embodiment. Low-boiling substances and/or inert gases can be removed from the container by this gas separator. Any desired gas separator known to the person skilled in the art may be used for this.

In an alternative embodiment, the volume compensation means comprise a buffer container into which a part of the heat storage medium can flow when there is a volume increase of the heat storage medium. When there is a volume decrease of the heat storage medium, the heat storage medium then correspondingly flows out of the buffer container and back into the container. In order to be able to operate the buffer container isobarically, it is possible to provide the buffer container with a flexible cover as described above for the container. As an alternative, it is also possible to operate the buffer container with a gas overhead, in which case gas is taken from the buffer container when the buffer container is being filled with heat storage medium and gas flows into the buffer container again when heat storage medium is being taken from the buffer container. To this end, for example, it is possible to provide a separate gas storage tank which receives the outflowing gas and from which the gas can flow back into the buffer container again. As an alternative, as in currently known systems, it is also possible to let the gas flow out of the buffer container when there is a volume increase of the heat storage medium and to feed gas back into the buffer container again from a gas storage device. An advantage in comparison with volume compensation with a gas overhead in the container is that the volume of the buffer container can be kept very much smaller and a very much smaller amount of gas is therefore required. Another advantage is that only the thermal expansion of the heat storage medium needs to be buffered. The volume change to be buffered, which predominates in systems of the prior art, due to thermal expansion of the gas space and condensation in the case of heat storage mediums having a significant vapor pressure, is not necessary.

If a buffer container is used, when there is a volume increase of the heat storage medium, heat storage medium is preferably pumped out of the container in the region of the container bottom and transferred into the buffer container. Correspondingly, when there is a volume decrease of the heat storage medium in the container, heat storage medium from the buffer container is returned back into the container through the same line.

The use of the buffer container makes it possible to operate the container used for storing heat with a constant volume of heat storage medium. In order to be able to discharge the excess heat storage medium from the container when there is a volume increase, or transfer the required amount of heat storage medium into the container when there is a volume decrease, respectively, a suitable volume regulation is advantageous. The volume regulation may, for example, be carried out by means of position detection of a storage plate covering the heat storage medium. As soon as the storage plate is lowered, heat storage medium from the buffer container is delivered into the container, and liquid is discharged from the container into the buffer container when the storage plate is raised. The delivery of the heat storage medium from the buffer container into the container, and it s discharge from the container into the buffer container, may for example be carried out by a pump system with a changeable pumping direction. The pump system is in this case preferably controlled by the volume regulation.

The position change of the storage plate may, for example, be recorded with the aid of suitable sensors. Sensors which can be used for this are, for example, position sensors and force sensors, which are used in weighing technology. For example, standard weighing cells may be used, optionally a plurality in parallel connection with a force measurement by means of strain gauges.

In order to be able to supply heat to the heat storage medium being used, or take heat from the heat storage medium, in a first embodiment it is delivered from the container into a suitable heat exchanger in which the heat storage medium absorbs heat from a heat carrier or releases heat to the heat carrier. In an alternative embodiment, the heat storage medium is used directly as a heat carrier. In this case, for example in a solar power station, the heat storage medium is heated in a solar field in order to store heat and delivered into the container. In order to use the heat, the heat storage medium may then for example be used in a heat exchanger in order to generate superheated steam for operating turbines, which drive generators for electricity generation. In order to extract the heat storage medium, immersion pumps are conventionally used, which project into the heat storage medium. In known systems, the immersion pump is arranged centrally in the middle of the container. Particularly when using a container having a flexible cover, however, such an arrangement requires an additional flexible region which encloses the immersion pump. In order to avoid this, in a preferred embodiment, it is for example possible to make the immersion pump project laterally into the container. The immersion pump does not therefore penetrate through any moving parts of the container. Besides lateral projection into the container, as an alternative it is also possible to provide a chamber which is connected to the container and in which the immersion pump is arranged. The chamber is in this case advantageously separated from the container only by a wall, so that the container and the chamber are formed integrally overall. This has the advantage that it is not necessary for two separate components to be insulated; rather, common insulation is sufficient for the container and the chamber. By means of a suitable feed, for example an opening in the wall, heat storage medium can flow into the chamber and be extracted from the chamber with the aid of the immersion pump. The opening in this case advantageously lies in the lower region.

When using a buffer container it is likewise possible to feed the immersion pump laterally into the container, or to provide a chamber in which the immersion pump is arranged. It is, however, preferred for the immersion pump to be arranged centrally in the container when a buffer container is used, as is known from the prior art.

In a particularly preferred embodiment, the heat storage device tank is formed as a stratified storage tank, also referred to as a thermocline storage device. By configuring the storage device as a stratified storage tank, it is possible to obviate the empty second storage tank known from the prior art. It is not necessary respectively to pump the heat storage material from the hot storage tank into a cold storage tank, or from the cold storage tank into a hot storage tank.

In a stratified storage tank, a temperature gradient occurs in the heat storage medium. Since the hot heat storage medium is usually lighter than the heat storage medium when cold, there is hot heat storage medium in the upper region of the stratified storage tank and cold heat storage medium in the lower region. Owing to this effect, a temperature gradient is stabilized in the container. The latter is hot in the upper region and cold in the lower region. When loading with the heat storage medium, hot heat storage medium is delivered into the stratified storage tank in the upper region. In equal amounts, cold material is discharged at the bottom of the stratified storage tank. Correspondingly, when unloading the heat storage tank, i.e. in order to use the heat stored in the heat storage tank, hot heat storage medium is taken from the upper region of the heat storage tank and cold heat storage medium is supplied to the bottom.

It is particularly advantageous to employ stratified storage tanks when using heat storage mediums having a low thermal conductivity. In the case of heat storage mediums having a high thermal conductivity, nonconvective thermal conduction takes place in the stratified storage tank from hot regions into cold regions, and temperature equilibration takes place. This effect is not so pronounced in the case of materials which conduct heat poorly, so that a temperature difference is maintained in the heat storage device even over a prolonged period of time.

If the cross section of the heat storage device configured as a stratified storage tank is kept small, then the usable amount of heat which is stored in the device can be kept high and the efficiency can therefore be improved. Besides a small cross section, a large height of the container is advantageous in this case. The height of the container, however, is limited by the hydrostatic pressure of the heat storage medium, by which the wall of the container is loaded. A correspondingly large volume for the heat storage medium can be achieved, for example, by connecting a plurality of heat storage devices configured as stratified storage tanks in series. In this case, it is particularly advantageous for each of the containers for holding the heat storage medium, which are connected in series, to be equipped with a volume compensation means. If a buffer container is used as a volume compensation means, however, it is also possible for all the containers for holding the heat storage medium, which are connected in series, to be connected to the buffer container.

The heat storage device according to the invention and the heat storage method are suitable in particular for the operation of solar power stations. In this case, the heat generated in the solar power station is delivered to the heat storage medium. When using a liquid heat storage medium, it is possible for the heat storage medium to be used simultaneously as a heat carrier. As an alternative, it is also possible to use a heat carrier which absorbs the heat generated in the solar power station and then releases the heat to the heat storage medium in a suitable heat exchanger.

Solar power stations which can use the device according to the invention and the method according to the invention are, for example, parabolic trough solar power stations.

In order to be able to absorb a sufficiently large amount of heat and operate the heat storage device at a sufficiently high temperature, which is sufficient in order to operate a turbine in a solar power station, for example, it is necessary to use heat storage mediums which are stable at the corresponding temperatures. For example, salt melts may be used as heat storage mediums. Salt melts, in particular ones which contain potassium or lithium, are however very expensive and lead to considerable investment costs for the large amounts required. Furthermore, resources may become scarce owing to the large amounts required, so that alternatives are necessary. As alternatives, for example, it is possible to use heat storage mediums which contain sulfur. Sulfur is formed as a waste product in the desulfurization of fuels, and can be obtained in large amounts at comparatively low costs. Elemental sulfur, in particular, is suitable as a heat storage medium which contains sulfur. In order to adapt the vapor pressure and the melting point, it is advantageous to supply the sulfur with at least one additive containing anions.

Suitable additives containing anions are, in particular, ones which are not oxidized at the operating temperature of the sulfur into oxidation products, for example sulfur oxides, sulfur halides or sulfur oxyhalides. It is furthermore advantageous that the additives containing anions can dissolve well in sulfur.

Preferred additives containing anions are ionic compounds of a metal of the periodic table with monoatomic or polyatomic, singly or multiply negatively charged anions.

Metals of the ionic compounds are for example alkali metals, preferably sodium, potassium; alkaline-earth metals, preferably magnesium, calcium, barium; metals of group 13 of the periodic table, preferably aluminum; transition metals, preferably manganese, iron, cobalt, nickel, copper, zinc.

Examples of such anions are: halides and polyhalides, for example fluoride, chloride, bromide, iodide, triiodide; chalcogenides and polychalcogenides, for example oxide, hydroxide, sulfide, hydrogen sulfide, disulfide, trisulfide, tetrasulfide, pentasulfide, hexasulfide, selenide, telluride; pnicogenides, for example amide, imide, nitride, phosphide, arsenide; pseudo-halides, for example cyanide, cyanate, thiocyanate; complex anions, for example phosphate, hydrogen phosphate, dihydrogen phosphate, sulfate, hydrogen sulfate, sulfite, hydrogen sulfite, thiosulfate, hexacyanoferrates, tetrachloroaluminate, tetrachloroferrate.

Examples of additives containing anions are: aluminum (III) chloride, iron(III) chloride, iron(II) sulfide, sodium bromide, potassium bromide, sodium iodide, potassium iodide, potassium thiocyanate, sodium thiocyanate, disodium sulfide ($Na_2S$), disodium tetrasulfide ($Na_2S_4$), disodium pentasulfide ($Na_2S_5$), dipotassium pentasulfide ($K_2S_5$), dipotassium hexasulfide ($K_2S_6$), calcium tetrasulfide ($CaS_4$), barium trisulfide ($BaS_3$), dipotassium selenide ($K_2Se$), tripotassium phosphide ($K_3P$), potassium hexacyanoferrate (II), potassium hexacyanoferrate (III), copper(I) thiocyanate, potassium triiodide, cesium triiodide, sodium hydroxide, potassium hydroxide, cesium hydroxide, sodium oxide, potassium oxide, cesium oxide, potassium cyanide, potassium cyanate, sodium tetraaluminate, manganese(II) sulfide, cobalt(II) sulfide, nickel(II) sulfide, copper(II) sulfide, zinc sulfide, trisodium phosphate, disodium hydrogen phosphate, sodium dihydrogen phosphate, disodium sulfate, sodium hydrogen sulfate, disodium sulfite, sodium hydrogen sulfite, sodium thiosulfate, tripotassium phosphate, dipotassium hydrogen phosphate, potassium dihydrogen phosphate, dipotassium sulfate, potassium hydrogen sulfate, dipotassium sulfite, potassium hydrogen sulfite, potassium thiosulfate.

Additives containing anions in the context of this application are furthermore mixtures of two or more compounds of a metal of the periodic table with monoatomic or polyatomic, formally, singly or multiply negatively charged anions, preferably anions made up of nonmetal atoms. According to the current state of knowledge, the quantity ratio of the individual components is not critical.

The mixture according to the invention preferably contains elemental sulfur in the range of from 50 to 99.999 wt %, preferably in the range of from 80 to 99.99 wt %, particularly preferably 90 to 99.9 wt %, in each case expressed in terms of the total mass of the mixture according to the invention.

The mixture according to the invention preferably contains anion-containing additives in the range of from 0.001 to 50 wt %, preferably in the range of from 0.01 to 20 wt %, particularly preferably 0.1 to 10 wt %, in each case expressed in terms of the total mass of the mixture according to the invention.

The mixture according to the invention may contain further added substances, for example additives which reduce the melting point of the mixture. The proportion of further added substances generally lies in the range of from 0.01 to 50 wt %, in each case expressed in terms of the total mass of the mixture.

Mixtures of alkali metal polysulfides of the general formula $$(M^1_x M^2_{(1-x)})_2 S_y$$

may furthermore be used, where $M^1$, $M^2$=Li, Na, K, Rb, Cs and $M^1$ is different to $M^2$, and $0.05 \leq x \leq 0.95$ and $2.0 \leq y \leq 6.0$.

In a preferred embodiment of the invention, $M^1$=K and $M^2$=Na.

In another preferred embodiment of the invention, $0.20 \leq x \leq 0.95$. In a particularly preferred embodiment of the invention, $0.50 \leq x \leq 0.90$.

In another preferred embodiment of the invention, $3.0 \leq y \leq 6.0$. In a particularly preferred embodiment of the invention, y=4.0, 5.0 or 6.0.

In a particularly preferred embodiment of the invention, $M^1$=K and $M^2$=Na, $0.20 \leq x \leq 0.95$ and $3.0 \leq y \leq 6.0$.

In a more particularly preferred embodiment of the invention, $M^1$=K and $M^2$=Na, $0.50 \leq x \leq 0.90$ and y=4.0, 5.0 or 6.0.

Likewise suitable are mixtures of alkali metal polysulfides and alkali metal thiocyanates of the general formula $$((M^1_x M^2_{(1-x)})_2 S_y)_m (M^3_z M^4_{(1-z)} SCN)_{(1-m)}$$

where $M^1$, $M^2$, $M^3$, $M^4$=Li, Na, K, Rb, Cs and $M^1$ is different to $M^2$, $M^3$ is different to $M^4$, and $0.05 \leq x \leq 1$, $0.05 \leq z \leq 1$, $2.0 \leq y \leq 6.0$ and m is the mole fraction with $0.05 \leq m \leq 0.95$.

In a preferred embodiment of the invention, $M^1$ and $M^3$=K and $M^2$ and $M^4$=Na.

In another preferred embodiment of the invention, $0.20 \leq x \leq 1$. In a particularly preferred embodiment of the invention, $0.50 \leq x \leq 1$.

In another preferred embodiment of the invention, $3.0 \leq y \leq 6.0$. In a particularly preferred embodiment of the invention, y=4.0, 5.0 or 6.0.

In another preferred embodiment of the invention, $0.20 \leq z \leq 1$. In a particularly preferred embodiment of the invention, $0.50 \leq z \leq 1$.

In another preferred embodiment of the invention, $0.20 \leq m \leq 0.80$. In a particularly preferred embodiment of the invention, $0.33 \leq m \leq 0.80$.

In a particularly preferred embodiment of the invention, $M^1$ and $M^3$=K and $M^2$ and $M^4$=Na, $0.20 \leq x \leq 1$, $0.20 \leq z \leq 0.95$, $3.0 \leq y \leq 6.0$ and $0.20 \leq m \leq 0.95$.

In another particularly preferred embodiment of the invention, $M^1$ and $M^3$=K and $M^2$ and $M^4$=Na, $0.50 \leq x \leq 1$, $0.50 \leq z \leq 0.95$, y=4.0, 5.0 or 6.0 and $0.33 \leq m \leq 0.80$.

In another particularly preferred embodiment of the invention, $M^1$ and $M^3$=K, x=1, z=1, y=4.0, 5.0 or 6.0 and $0.33 \leq m \leq 0.80$.

In another particularly preferred embodiment of the invention, $M^1$ and $M^3$=K, x=1, z=1, y=4 and m=0.5.

In another particularly preferred embodiment of the invention, $M^1$ and $M^3$=K, x=1, z=1, y=5 and m=0.5.

In another particularly preferred embodiment of the invention, $M^1$ and $M^3$=K, x=1, z=1, y=6 and m=0.5.

Heat storage mediums which are oxidation-sensitive and have a high vapor pressure are particularly advantageously employed in a stratified storage tank.

When using a buffer container for the volume compensation, it is preferable to operate the buffer container cold and cover it with an inert gas if a heat storage medium having a non-negligible vapor pressure is being used. By cold operation of the buffer container, it is substantially possible to prevent the heat storage medium from evaporating in the buffer container. Cold operation of the buffer container in this case means that the temperature in the buffer container is much lower than the boiling temperature of the heat storage medium. By cold operation of the buffer container, it is possible to obviate elaborate devices for the separation of gaseous heat storage medium entering into the off-gas, or make them much simpler.

In particular, it is necessary for the phase boundary in the buffer container to be kept at a temperature much lower than the boiling temperature of the heat storage medium. In the scope of the present invention, "much lower than the boiling temperature" means that the temperature is at most 70%, preferably at most 60% of the boiling temperature in kelvin.

A cold phase boundary in the buffer container may for example be achieved, with series connection of a plurality of stratified storage tanks, by respectively using fully filled containers and using the last container, which contains the heat storage medium at the lowest temperature, as a buffer container. As an alternative, it is also possible to provide a plurality of buffer containers, each of which is fully filled except for the last buffer container. The advantage of using a plurality of buffer containers connected in series, in which the last buffer container contains the phase boundary with the gas, is that the heat loss from the container can be kept low. The size of the buffer container will be selected as a function of the expansion coefficient of the heat storage medium and the working temperature difference according to the heat storage medium used. When using heat storage mediums containing sulfur and working temperatures of between 290° C. and 390° C., the size of the buffer container is for example at least 3.5 hundredths of the volume of the container for holding the heat storage medium.

If buffer containers are used, when hot heat storage medium enters a cooler buffer container it is possible for the, less dense hot heat storage medium to reach the upper regions by convection and prevent the formation of a cold phase boundary. The destructive convection may, for example, be prevented by respectively supplying and discharging the hot heat storage medium in the upper region of a buffer container, and supplying and discharging cold heat storage medium respectively in the lower region of the buffer container. In this case, it is possible on the one hand to provide buffer containers separated from one another or as an alternative to provide fixtures in a buffer container, which respectively contain openings in the lower region in order to allow transport of cold heat storage medium, or alternatively in the upper region in order to allow transport of hot heat storage medium. In particular, for connection into the buffer container in which the cold phase boundary exists, it is advantageous to provide a supply and discharge in the lower region and feed the connection into the lower region of the upstream buffer container. In this way, cool heat storage medium is delivered from the preceding buffer container into the buffer container with the phase boundary, or cold heat storage medium is fed from the buffer container with the phase boundary into the preceding buffer container.

If cooling is not sufficient in order to achieve a temperature of the phase boundary at which evaporation of the heat storage medium can be avoided, it is also possible for example to provide an internal heat exchanger by which the heat storage medium in the buffer container with the phase boundary can be cooled. In this way, evaporation of heat storage medium can be avoided.

In another preferred embodiment, the buffer container is arranged so that the phase interface in the buffer container is at a similar hydrostatic level to the liquid surface in the container for holding the heat storage medium. In this case, even during shutdown, the supply and discharge pumps cause only minor hydrostatic forces on the container for holding the heat storage medium and the buffer container. Furthermore, only minimal energy expenditure is needed for operating the pumps, since the hydrostatic pressure of the heat storage medium acts in both directions, that is to say both for supplying heat storage medium from the buffer container into the container and from the container into the buffer container.

In another advantageous configuration, the buffer container is configured with a large cross-sectional area. Owing to the large cross-sectional area, unavoidable volume changes of the heat storage medium due to a temperature change cause only a small change in the hydrostatic level of the liquid surface in the buffer container. The effects of the hydrostatic forces which act can thereby be kept small.

Exemplary embodiments of the invention are presented below with the aid of the figures and will be explained in more detail in the following description.

FIG. 1.1 shows a container for holding a heat storage medium, having a flexible cover and containing a cold heat storage medium, FIG. 1.2 shows a container for holding a heat storage medium, having a flexible cover and containing a hot heat storage medium, FIG. 2 shows a container for holding a heat storage medium, having a flexible cover and an immersion pump in a first embodiment, FIG. 3 shows a container for holding a heat storage medium, having a flexible cover and an immersion pump in a second embodiment, FIG. 4 shows a device for storing heat, having a buffer container, FIG. 5 shows containers for holding a heat storage medium, as serial stratified storage tanks, FIG. 6 shows a container for holding a heat storage medium, which is configured as a stratified storage tank, FIG. 7 shows a manifold, as is used in a stratified storage tank according to FIG. 6, in plan view, FIG. 8 shows two buffer containers connected in series, FIG. 9 shows a container for holding a heat storage medium, which is combined integrally with a buffer container, FIG. 10 shows a container for holding a heat storage medium, having buffer containers in another embodiment.

FIG. 1.1 shows a container for holding a heat storage medium, having a flexible cover and containing a cold heat storage medium. A container 1 is filled with a heat storage medium 3. Any desired medium which can absorb and store heat is suitable as the heat storage medium. Conventionally used heat storage mediums are, for example, salt melts. The container represented in FIG. 1 is particularly preferably suitable for holding a heat storage medium containing sulfur.

After the heat storage medium has released heat, for example in order to operate a solar power station, it has a lower temperature than after absorbing heat which is intended to be stored by the heat storage medium. The cooled heat storage medium 3 has a smaller volume than the heated heat storage medium 3, as represented in FIG. 1.2.

In order to prevent too great a positive pressure from being formed in the container, it is advantageous for the container to contain no gas or only a small amount of gas. To this end, the container 1 is covered with a cover 5. Another effect of the cover 5, particularly in the case of oxidation-sensitive heat storage mediums 3, is to avoid a reaction of the heat storage medium 3 with gas, which is contained in an atmosphere above the collection storage medium 3. Preferably, no gap is formed between the cover 5 and the heat storage medium 3.

In order to compensate for volume variations of the heat storage medium 3, the cover 5 is configured flexibly. To this end, for example, flexible regions 7 are formed on the cover 5 as represented in FIGS. 1.1 and 1.2. As an alternative to the embodiment represented in FIGS. 1.1 and 1.2, it is also possible to configure the entire cover 5 flexibly. The flexible regions 7 may for example be configured in the form of a compensator, for example in the form of a bellows. The cover 5 in the embodiment represented in FIGS. 1.1 and 1.2 is fastened to the wall 9 of the container 1 by the flexible region 7. The fastening of the cover 5 having the flexible regions 7 on the wall 9 of the container 1 is preferably carried out by a form fit, for example by a welding method. This prevents heat storage medium 3 from being able to escape by leaks between the wall 9 of the container 1 and the cover 5, or gas from being able to enter the container 1.

Owing to the flexible regions 7, both in the case of a cold heat storage medium 3 as represented in FIG. 1.1 and in the case of a hot heat storage medium 3 as represented in FIG. 1.2, the cover 5 can rest flush on the heat storage medium 3. By the expansion due to heating of the heat storage medium 3, the cover 5 is raised by the heat storage medium 3. The flexible regions 7 make it possible to raise the cover 5 without compromising the leaktightness of the container 1.

So that the heat storage medium 3 can absorb heat, it is for example possible to take the heat storage medium 3 from the container 1 and feed it through a heat exchanger, in which the heat storage medium 3 absorbs heat. Subsequently, the heat storage medium 3 may be reintroduced into the container 1. In this way, the container 1 continuously contains the same mass of heat storage medium 3. Correspondingly, in order to release heat from the heat storage medium 3, heat is released to another medium by means of the heat exchanger.

In order to absorb heat, it is also possible for the heat storage medium 3 to be fed for example into a solar field of a solar power station where it absorbs heat.

As an alternative, it is also possible for example for the container 1 to contain a heat exchanger, by means of which heat can be released to the heat storage medium or by means of which the heat storage medium 3 can release heat to a heat carrier flowing through the heat exchanger.

If the heat storage medium 3 is transported to a heat exchanger which is positioned outside the container 1, to this end for example an immersion pump is used. Possible positioning of an immersion pump is represented in FIGS. 2 and 3. FIG. 2 shows a container for holding a heat storage medium, having a flexible cover and an immersion pump in a first embodiment.

The container 1 corresponds in its structure to the container represented in FIGS. 1.1 and 1.2.

In order to allow unimpeded movement of the cover 5, an immersion pump 11 is fed into the container 1 through the side wall 9. The immersion pump 11 is configured so that the intake region 13 of the immersion pump 11 is positioned at the bottom of the container 1. With the aid of the immersion pump 11, heat storage medium 3 can then be taken from the container 1.

FIG. 3 shows a container for holding a heat storage medium, having a flexible cover and an immersion pump in a second embodiment.

In contrast to the embodiment represented in FIG. 2, a chamber 15 is fitted laterally on the container 1 in the embodiment represented in FIG. 3. In this case the immersion pump 11 is located in the chamber 15. This has the advantage that the immersion pump 11 does not have to penetrate through the wall 9 of the container 1.

By means of a feed (not represented in FIG. 2 and FIG. 3), an equal amount of heat storage medium is then returned into the container 1 so that the container 1 contains a constant mass of heat storage medium.

In order to fill the chamber 15 with heat storage medium 3 and therefore be able to take heat storage medium from the container 1 with the aid of the immersion pump 11, an opening 19 through which the heat storage medium 3 can flow out of the container 1 into the chamber 15 is preferably formed in the lower region of the container wall 17, which separates the chamber 15 from the container 1. With the aid of the immersion pump 11, heat storage medium can then be taken from the container 1 and heated or cooled heat storage medium can be supplied to the container 1 through a feed (not represented in FIG. 3 either), in order to keep the mass of heat storage medium 3 in the container 1 constant. The cooled or heated heat storage medium is preferably supplied to the container 1 in the upper region.

Owing to the arrangement of the immersion pump 11 as represented in FIGS. 2 and 3, it is possible to arrange the immersion pump 11 so that it does not impede the cover 5 during volume compensation of the heat storage medium 3 in the container 1.

FIG. 4 shows a device for storing heat, having a buffer container.

As an alternative to the embodiment represented in FIGS. 1.1 to 1.2, in which the container 1 is covered with a cover 5 having flexible regions 7 so that volume variations of the heat storage medium 3 can be compensated for by the cover 5, it is also possible to provide a buffer container 21.

In order to compensate for volume variations, when there is a volume increase of the heat storage medium some of the heat storage medium is fed into the buffer container 21. In this way, it is possible to maintain a constant volume of heat storage medium 3 in the container 1. In the buffer container 21, it is possible for example to provide a flexible cover as represented in FIGS. 1.1 to 3, in order to compensate for filling differences which result from the volume change of the heat storage medium. As an alternative and preferably, however, a gas overhead can be provided in the buffer container 21. To this end, as the amount with which the buffer container 21 is filled decreases, a gas is fed through a gas supply line 23 into the buffer container 21. The gas which is fed into the buffer container 21 is a gas which is inert in relation to the heat storage medium 3, in order to prevent a reaction of the gas with the heat storage medium 3. Nitrogen, in particular, is suitable as the gas. It is, however, also possible to use noble gases, for example. Nevertheless, the use of nitrogen is preferred. The devices for supplying and discharging the gases may be part of a control loop, which keeps the gas pressure in the buffer storage tank and/or the volume in the container 1 constant.

If heat storage medium is fed into the buffer container 21 owing to a volume increase of the heat storage medium, and the filling state in the buffer container 21 therefore increases, gas is taken from the buffer container 21 through a gas discharge 25. In this case, on the one hand, it is possible to discharge the gas to the surroundings, as is preferred when using nitrogen, or as an alternative to feed it into a gas storage tank. Particularly in the case of gases other than nitrogen, recycling into a gas storage tank is preferred.

In order to store heat, heat storage medium is taken from the container 1 through a lower line 27, which lies in the region of the bottom of the container 1. In order to extract the heat storage medium, a pump 29 is used. By means of the pump 29, the heat storage medium is fed into a heat exchanger 31. In the heat exchanger 31, the heat storage medium 3 absorbs heat. The heat storage medium 3 heated in this way is then fed back into the container 1 through an upper line 33. A temperature gradient is then set up in the container 1, the upper region containing hot heat storage medium 3 and the lower region of the container 1 containing cold heat storage medium. The upper line 33 leads into the container in the upper region of the container 1, preferably directly below a cover 35 which closes the container at the top.

In order to be able to take heat from the heat storage tank again, the heat storage medium 3 is taken from the container 1 through the upper line 33 and fed into the heat exchanger 31. In the heat exchanger 31, the heat storage medium then releases heat for example to a heat carrier. The heat storage medium 3 is thereby cooled. The cooled heat storage medium is then fed back into the container 1 with the aid of the pump 29 through the lower line 27. As an alternative to the embodiment described here, in which heat is supplied or heat is extracted through the same circuit, it is also possible to provide a first heat exchanger by means of which the heat storage medium 3 is heated and a second heat exchanger, in which the heat storage medium 3 releases heat again. To this end, for example, a second circuit may then be used.

Because the hot heat storage medium is supplied in the upper region of the container 1 and the cold heat storage medium is discharged from the lower region, heat stratification is set up so that the device is formed as a stratified storage tank.

FIG. 5 shows containers for holding a heat storage medium, as serial stratified storage tanks.

As an alternative to the embodiment represented in FIG. 4 with only one container, it is also possible for example to use a serial stratified storage tank. A serial stratified storage tank may comprise any desired number of containers. In the embodiment represented in FIG. 5, the serial stratified storage tank 37 comprises three containers. By using serial stratified storage tanks 37, it is possible to reduce the cross-sectional area. In this way, losses which occur inside the heat storage medium owing to thermal conduction can be reduced further. For example, the loss of usable heat decreases with an increasing height of the container. The increasing height of the container can be simulated by the serial stratified storage tank 37. Use of the serial stratified storage tank has the advantage that the individual containers do not have to be made so high, so that a lower pressure acts on the wall of the container, particularly in the lower regions. The container can therefore be produced with less stability.

In order to operate a serial stratified storage tank, the individual containers 1 are connected to one another by means of lines 39, 41. A first line section 43 respectively projects into the region of the bottom of the container 1 which contains the warmer heat storage medium, and a second line section 45 projects into the upper region of the container 1 which contains the somewhat colder heat storage medium. In particular, it is advantageous for the temperature of the heat storage medium in the lower region of the container which contains the warmer heat storage medium 3 to be approximately the same as the temperature of the heat storage medium 3 in the upper region of the container 1 which contains the somewhat colder heat storage medium. By connecting two or more containers 1 in succession, the temperature difference between the upper region and the bottom of the container becomes less than when only one container is used.

In order to be able to operate a serial stratified storage tank 37, hot heat storage medium is supplied in the upper region of the hottest container and cold heat storage medium is extracted at the bottom of the coldest container, or cold heat storage medium is supplied at the bottom of the coldest container and hot heat storage medium extracted in the upper region of the hottest container. To the same extent as heat storage medium is taken from one of the containers of the serial stratified storage tank 37, heat storage medium from a container is pumped through the lines 39, 41 into the neighboring container in order to compensate for volume changes in the containers 1.

FIG. 6 shows a container for holding a heat storage medium, which is configured as a stratified storage tank. In a container configured as a stratified storage tank 47 for holding a heat storage medium 3 as already described above, there is hot heat storage medium 3 in the upper region 49 of the container and colder heat storage medium in the lower region 51. Temperature boundaries 53 are formed in the stratified storage tank 47, which migrate downward when cold heat storage medium is extracted and hot heat storage medium is supplied, and migrate upward when hot heat storage medium is extracted and cold heat storage medium is supplied. In order to prevent convection from taking place when heat storage medium is supplied into the container 1, suitable manifolds/distributors 55 are used. When hot heat storage medium is extracted, the upper manifold/distributor 55 acts as a manifold for extracting heat storage medium and the lower manifold/distributor 55 as a distributor, through which heat storage medium is supplied into the container 1. Correspondingly, when extracting cold heat storage medium, the lower manifold/distributor 55 is used as a manifold and the upper manifold/distributor 55 as a distributor. The manifolds/distributors 55 are respectively connected to a line 57, which leads for example to a heat exchanger.

A suitable form for a manifold/distributor is represented in FIG. 7. In the embodiment represented here, the manifold/distributor 55 comprises three concentric rings 59, which are respectively connected to the line 57 at a position. Besides the configuration with three concentric rings 59 as represented in FIG. 7, more than 3 or fewer than 3 rings may also be provided. Any other desired configurations, which allow uniform supply and extraction of the heat storage medium, are also possible.

In order to be able to supply and extract the heat storage medium uniformly, openings 61 are formed in each of the concentric rings 59. Through the openings 61, the heat storage medium can either be taken from the container 1 or supplied into the container 1.

Besides the embodiment with only one buffer container as represented in FIG. 4, as an alternative it is also possible to provide more than one buffer container, for example two buffer containers. This is represented by way of example in FIG. 8. Besides the embodiment with two buffer containers as represented in FIG. 8, more than two buffer containers may also be connected in series. The advantage of at least two buffer containers is that no convection of hot heat storage medium can take place onto the cold phase boundary when hot heat storage medium is being supplied into a first buffer container 63, which would prevent the formation of a cold phase boundary. In order to prevent disruptive convection, it is advantageous for the hot heat storage medium to be supplied in the upper region of the first buffer container 63, as represented in FIG. 8. Inside the first buffer container 63, the temperature decreases toward the bottom 65. The cold heat storage medium from the bottom 65 of the first buffer container 63 is then fed into a second buffer container 67. In the second buffer container 67, a cold phase boundary 69 is formed. Formation of the cold phase boundary 69 may be assisted by using a heat exchanger 71 in the second buffer container 67. By using the heat exchanger 71, it is possible to keep the temperature low in the second buffer container 67 and therefore also to keep the vapor pressure in the buffer container 67 as low as possible.

As an alternative, it is furthermore possible as represented in FIG. 9 to provide only one container, which is separated into individual regions by fixtures 73. By the fixtures 73, which are preferably configured as vertical walls inside the container, the container is divided into individual regions with different temperatures. In this case, it is particularly advantageous for an essentially isothermal region 77 to be formed respectively between two regions 77 with temperature stratification. The isothermal region 77 is respectively provided in the vicinity of the bottom with an opening 79 to the warmer region 75 with temperature stratification and an upper opening 81 to the colder region 75 with temperature stratification. The coldest region 75 with temperature stratification is connected via an opening 79 to a cold zone 83, in which the phase boundary 69 is located. As in the embodiment represented in FIG. 8, the cold zone 83 in the second buffer container 67 may contain a heat exchanger 71 in order to keep the phase boundary 69 at an essentially constant temperature. The walls 73 may also be configured so as to be insulating.

In order to be able to extract gas possibly contained in the heat storage medium, the individual regions 75 are respectively provided with vents 85.

The first buffer container 63 of the embodiment represented in FIG. 8 preferably also has a corresponding vent 85.

A container for holding a heat storage medium, having buffer containers, in a second embodiment is represented in FIG. 10.

In contrast to the embodiment represented in FIG. 4, in the embodiment represented in FIG. 10 the buffer container 21 is positioned so that the phase boundary 69 in the buffer container is at a similar hydrostatic level to the phase boundary 87 of the heat storage medium 3 in the container 1. In order to be able to compensate for possible volume variations in the container 1, the heat storage medium 3 is preferably covered with a cover 89. The cover 89 is connected gastightly to the container 1. The arrows in FIG. 10 symbolize small movements within the elastic limits of the cover 89, which are recorded and reversed by means of volume regulation by feeding heat storage medium into the buffer container 21 or from the buffer container 21 into the container 1. To this end, when a rise of the cover 89 is recorded, heat storage medium is fed from the container 1 into the buffer container 21 and, when the cover 89 is lowered, heat storage medium is fed from the buffer container 21 into the container 1. In this way, an essentially constant volume is achieved in the container 1.

The advantage of positioning the buffer container 21 so that the phase boundary 69 is at a similar hydrostatic level to the phase boundary 87 of the heat storage medium 3 in the container 1 is that, even during a shutdown of the supply and discharge pumps, only minor hydrostatic forces act on the storage tanks. Furthermore, only minimal energy expenditure is needed for operating the pumps for volume compensation purposes.

It is furthermore advantageous if, as represented in FIG. 10, the buffer container 21 has a large cross-sectional area. As a result of a large cross-sectional area, unavoidable volume changes of the liquid phase of the heat storage medium due to a temperature change cause only small changes in the hydrostatic level of the liquid surface 69 in the buffer storage tank 21. As a result of this, the consequent hydrostatic forces remain small.

LIST OF REFERENCES 1 container
3 heat storage medium
5 cover
7 flexible regions
9 wall of the container 1
11 immersion pump
13 intake region
15 chamber
17 wall
19 opening
21 buffer container
23 gas supply line
25 gas discharge
27 lower line
29 pump
31 heat exchanger
33 upper line
35 cover
37 serial stratified storage tank
39 line
41 line
43 first line section
45 second line section
47 stratified storage tank
49 upper region
51 lower region
53 temperature boundary
55 manifold/distributor
57 line 59 ring
61 opening
63 first buffer container
65 bottom
67 second buffer container
69 cold phase boundary
71 heat exchanger
73 fixtures
75 region with temperature stratification
77 isothermal region
79 opening
81 upper opening
83 cold zone
85 vent
87 phase boundary
89 cover

We claim:

1. A device for storing heat, comprising a salt melt as heat storage medium which absorbs heat in order to store heat and releases heat in order to use the stored heat, and a container for holding the salt melt, the container being closed by a gastight cover, wherein the device comprises volume compensation means in order to compensate for a volume increase of the salt melt due to a temperature rise and a volume decrease due to a temperature reduction, wherein the volume compensation means comprise a buffer container, into which part of the salt melt can flow when there is a volume increase of the salt melt, the buffer container having an inlet for a gas supply line which supplies a gas that is inert with respect to the heat storage medium, and wherein the buffer container has a volume which is smaller than the volume of the container for holding the salt melt, and said volume of the buffer container corresponding to the thermal expansion of the salt melt to be buffered.

2. The device according to claim 1, wherein the heat storage device is formed as a stratified storage tank.

3. The device according to claim 1, wherein the heat storage medium contains sulfur.

* * * * *